United States Patent
Nihei et al.

[11] Patent Number: 6,059,169
[45] Date of Patent: May 9, 2000

[54] SPOT WELDING SYSTEM

[75] Inventors: Ryo Nihei, Fujiyoshida; Takeshi Okada, Oshino-mura, both of Japan

[73] Assignee: Fanuc Ltd, Yamanashi, Japan

[21] Appl. No.: 08/981,453

[22] PCT Filed: Apr. 25, 1997

[86] PCT No.: PCT/JP97/01462

§ 371 Date: Dec. 22, 1997

§ 102(e) Date: Dec. 22, 1997

[87] PCT Pub. No.: WO97/39853

PCT Pub. Date: Oct. 30, 1997

[30] Foreign Application Priority Data

Apr. 25, 1996 [JP] Japan ................................ 8-127689

[51] Int. Cl.⁷ .......................... B23K 37/02; B23K 37/00; B25J 11/00
[52] U.S. Cl. .............. 228/45; 228/44.3; 901/42
[58] Field of Search .................. 228/45, 8, 102, 228/44.3; 901/42

[56] References Cited

U.S. PATENT DOCUMENTS

| | | |
|---|---|---|
| 4,933,531 | 6/1990 | Ichikawa et al. |
| 5,438,647 | 8/1995 | Nagamatsu et al. ............ 395/82 |
| 5,449,876 | 9/1995 | Ko ................................ 219/108 |
| 5,493,093 | 2/1996 | Cecil ............................. 219/110 |
| 5,518,166 | 5/1996 | Numata et al. ................ 228/182 |
| 5,548,096 | 8/1996 | Akasaka et al. .............. 219/117.1 |
| 5,560,842 | 10/1996 | Kitaguchi et al. ............. 219/108 |

FOREIGN PATENT DOCUMENTS

| | | |
|---|---|---|
| 2-36083 | 2/1990 | Japan . |
| 4-266487 | 9/1992 | Japan . |
| 7-116983 | 5/1995 | Japan . |

*Primary Examiner*—Patrick Ryan
*Assistant Examiner*—Riley Stoner
*Attorney, Agent, or Firm*—Staas & Halsey LLP

[57] ABSTRACT

A spot welding system employing parallel link robots arranged densely with one another. When an arrival of a workpiece W being conveyed is detected by a camera CM, a frame moves along guides to start tracking of the workpiece, and a plurality of robots RB1–RB4, each having a parallel link with a plurality of expandable/retractable arms and a wrist mounted on a distal end of the parallel link, start operation. A plurality of points on the workpiece are welded by spot welding guns G1–G4 attached to the wrists of the respective robots. Proximal end portions of the expandable/retractable arms are swingably supported by an upright wall of the frame, and the respective robots are disposed so as to project from the frame. The parallel link robots may be suspended from the frame to be arranged densely.

6 Claims, 5 Drawing Sheets

SPOT WELDING SYSTEM

TECHNICAL FIELD

The present invention relates to a spot welding system using robots.

BACKGROUND ART

Spot welding systems using robots with spot welding guns are well known and widely adopted in an assembling process of an automobile body, for example. In general, the spot welding is not carried out only on a single welding spot but is practically carried out on a number of welding spots, especially in the assembling process of an automobile body.

Thus, in conventional spot welding systems, there is adopted a layout in which a plurality of articulated robots are arranged in a row to laterally project from an upright wall or to be suspended from a structure such as a ceiling or a beam. In some cases, instead of using an existing structure, a frame dedicated for installing robots is provided.

An object of welding such as an automobile body is transferred along a line which passes near the robots arranged in a row. Usually, the transferring action is intermittently repeated to stop successively at respective operating stages, where the spot welding is carried out on required spots.

However, in the conventional spot welding system using articulated robots encompass problems in efficiency of operation and space utilization. Specifically, it is difficult to arrange the articulated robots close to one another because of their structure or shape, and therefore it is impossible to take advantage of a high-density layout for improving the operational efficiency and for saving space.

DISCLOSURE OF INVENTION

An object of the present invention is to provide a spot welding system in which a plurality of robots can be arranged closer to one another to improve efficiency of spot welding and save space.

A spot welding system of the present invention adopts parallel link robots, each constituted by a parallel link having a plurality of expandable/retractable arms and a wrist mounted on a distal end of the parallel link and having a plurality of rotary drive axes, as robots to be densely arranged in row.

More specifically, in the spot welding system of the present invention, the parallel link robots are arranged on a frame closer to one another either to project laterally from the frame or to be suspended therefrom. A spot welding gun is attached to the wrist of each robot.

In a preferred embodiment, the frame on which the robots are arranged is movable along a conveying direction of a workpiece to be welded. Spot welding can be performed while tracking the workpiece by the movable frame.

BEST MODE OF CARRYING OUT THE INVENTION

Figure 1:
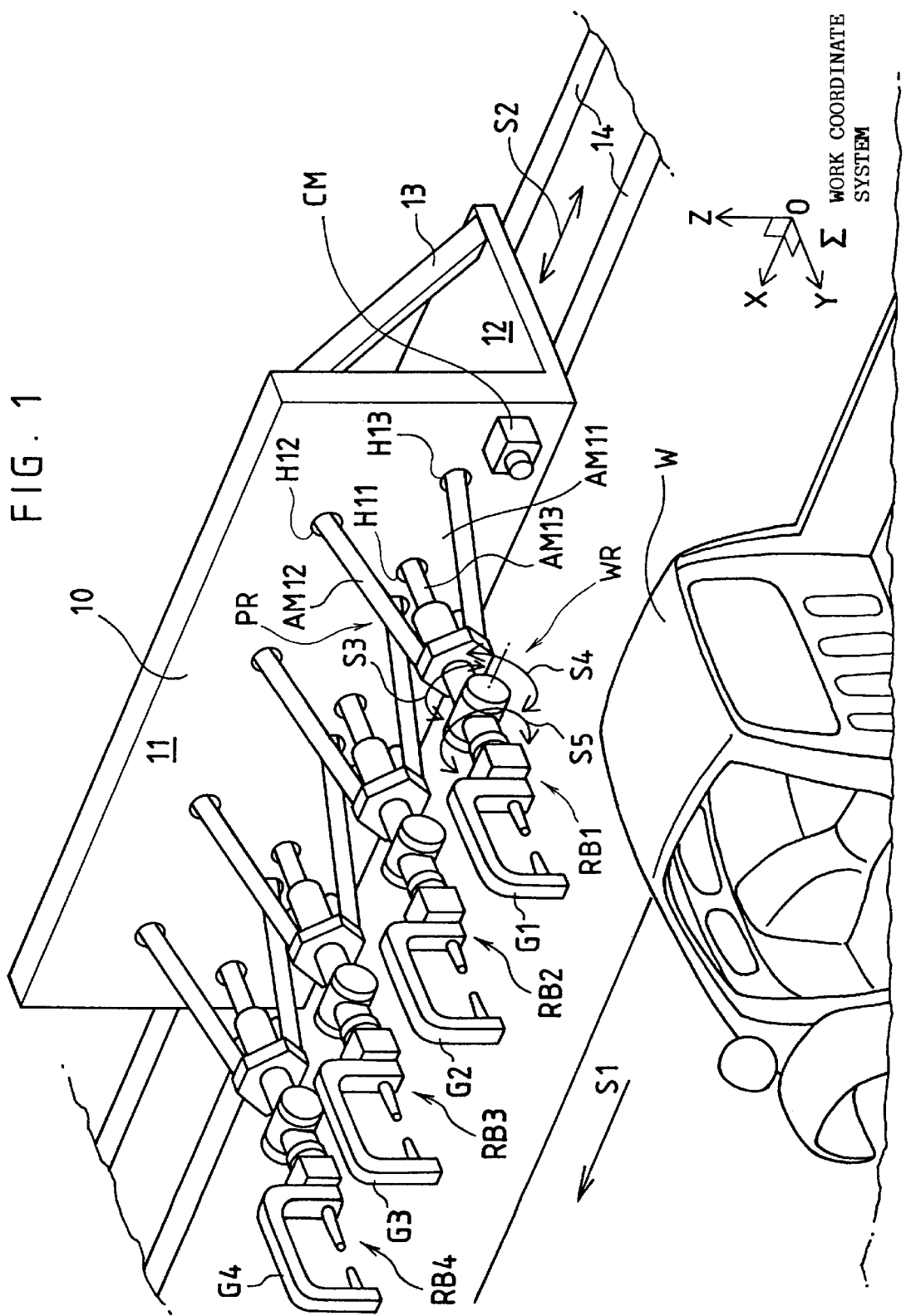
FIG. 1 is a perspective view showing a schematic layout of a spot welding system according to a first embodiment of the present invention.

In FIG. 1, a reference symbol S1 denotes a traveling direction of a conveyor (not shown) for conveying a workpiece (e.g., an unfinished automobile body assembly) W, and the traveling direction coincides with a X-axis direction of a work coordinate system $\Sigma$. Guides 14 are laid on a structure such as a floor along the traveling direction of the conveyor, and a frame 10 is movably mounted on the guides 14 in a direction indicated by an arrow S2.

The frame 10 comprises an upright wall portion 11 and a base portion 12 in L-shape, and reinforcing members 13. A camera CM for detecting a location of the workpiece W is disposed at an appropriate position on the upright wall portion 11. The camera CM constitutes a visual sensor together with an image processing unit incorporated in a controller, which is described later, and is used for tracking operations of the robots.

A plurality of parallel link robots RB1–RB4 are densely arranged in a row on the frame 10 along the traveling direction (the X-axis direction) of the conveyor. In general, the number of robots to be installed on one frame 10 may be any number. Further, needless to say, a plurality of frames 10 may be mounted on the same guides 14.

Each of the parallel link robots RB1–RB4 is a 6-axis robot, and comprises a parallel link PR having three expandable/retractable arms AM11–AM13, and a wrist WR mounted on a distal end of the parallel link PR and having three rotary drive axes.

The individual parallel link robots RB1–RB4 project laterally from the frame 10 with their arms AM11–AM13 extending over a traveling path of the workpiece W. The wrist portion has three rotary drive axes which rotate in the directions indicated by reference symbols S3, S4, S5, and is mounted on the distal end portion of the respective arms AM11–AM13. Spot welding guns G1–G4 are attached to the respective distal ends of the wrist portions. In some cases, however, a tool other than the welding gun, such as a jig, is mounted on some of the parallel link robots RB1–RB4 to perform a task other than welding.

Holes H11–H13 for the arms AM11–AM13 are formed at predetermined positions in the upright wall portion 11 of the frame 10. The arms AM11–AM13 pass through the corresponding holes H11–H13 to extend toward the base portion 12. Each of the holes H11–H13 has such a dimension that the hole does not interfere with the swinging motion of the corresponding arm AM11–AM13 within a range of motion thereof, and there is provided a bearing mechanism for swingably supporting the corresponding arm AM11–AM13 inside the hole, as described later.

Figure 2:
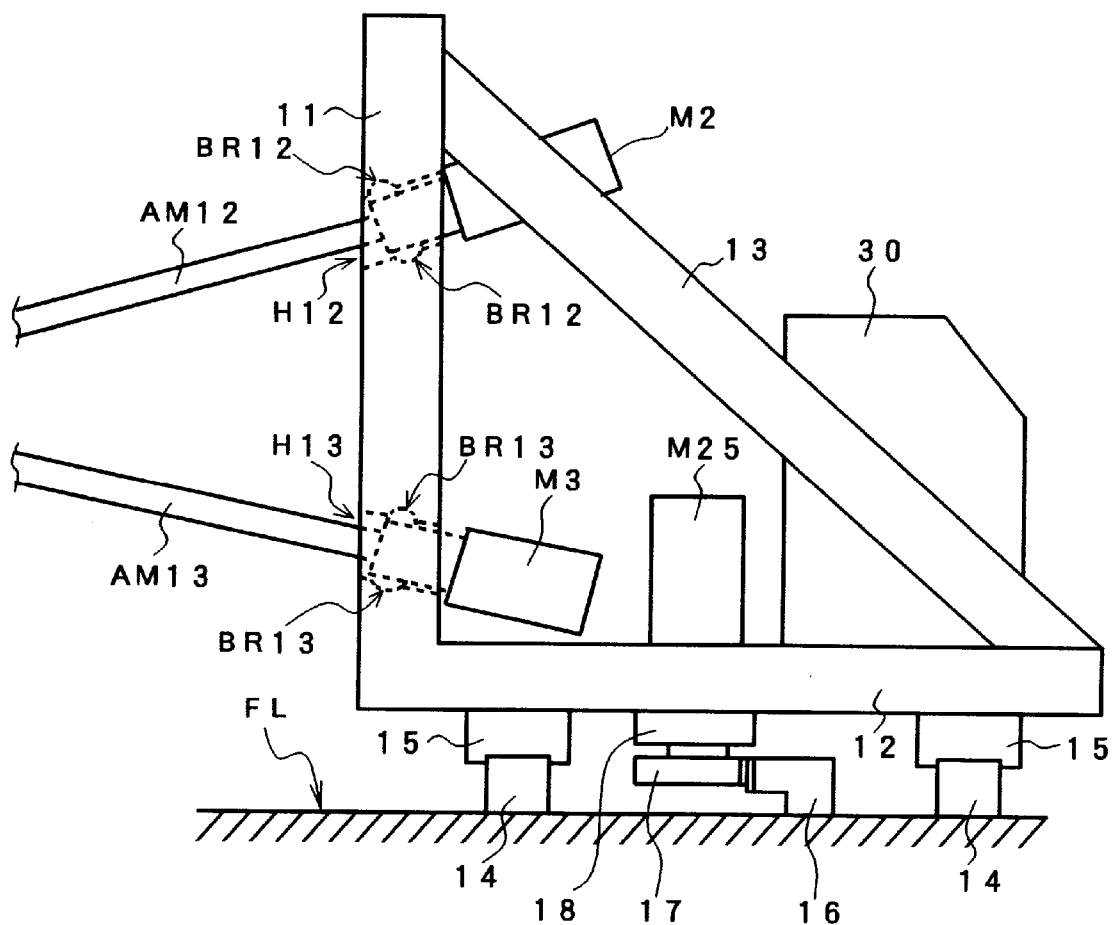
FIG. 2 is a partially enlarged view showing an arrangement on a base portion of a frame of the spot welding system shown in FIG. 1.

FIG. 2 shows an arrangement on the frame 10, in an enlarged scale around the proximal ends of the two arms AM12 and AM13 of the arms of the parallel link robot RB1. As shown in FIG. 2, traveling wheels 15 provided on the base portion 12 are engaged with the guides 14 laid on the floor FL. Further, a rack 16 is laid in parallel to the guides 14, and a pinion 17 is in mesh with the rack 16. The pinion 17 is connected to a servomotor M25 for a drive axis through a reduction gear 18.

On the other hand, servomotors M2 and M3 for driving the arms AM12 and AM13 to extend and retract are mounted on the proximal end portions of the arms AM12 and AM13. Although not shown in FIG. 2, there are provided a servomotor for driving the arm AM11 of the robot RB1 to expand or retract the arm on the proximal end portion thereof, and also servomotors for driving the respective arms of the other robots RB2–RB4 on the respective proximal end portions of the arms in exactly the same manner. Bearing mechanisms BR12 and BR13 for respectively supporting the arms AM12 and AM13 swingably are inserted into the holes H12 and H13 through which the arms AM12 and AM13 extend. The same arrangement as above is adopted with respect to the through holes for the other expandable/retractable arms.

The expanding/retracting mechanism of each of the arms AM11–AM13 is accommodated in a tubular member which forms a casing of each of the arms AM11–AM13 and includes a ball screw and a ball nut driven by the servomotor, and a bearing mechanism provided at a connecting portion with the wrist portion. As an operating principle and a positioning control of the parallel link robot are generally known in the art, a detailed description thereof is omitted here.

A controller 30 generally controls the parallel link robots RB1–RB4, the traveling axis (servomotor M25), the camera CM (see FIG. 1), the spot welding guns G1–G4, etc.

Figure 5:
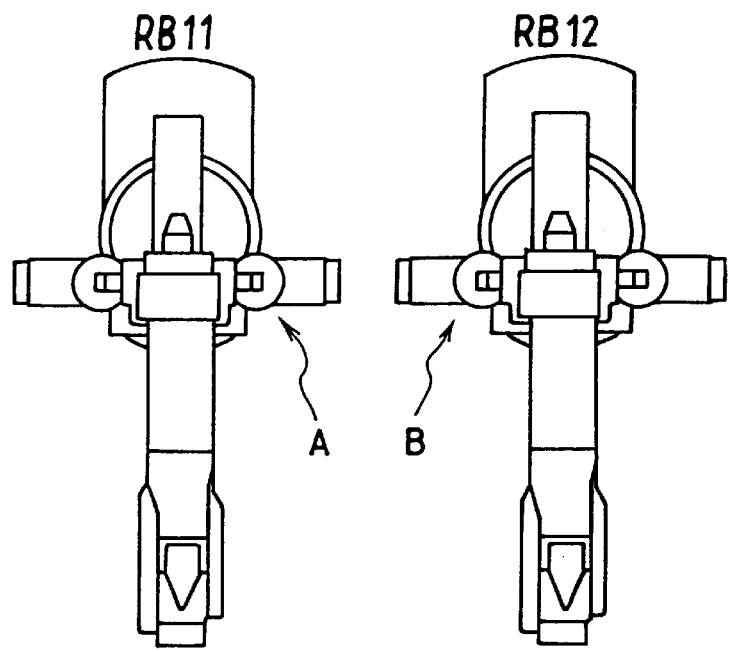
FIG. 5 is a diagram showing a layout of articulated robots employed in a conventional spot welding system and a layout of parallel link robots employed in the invention.
Figure 5:
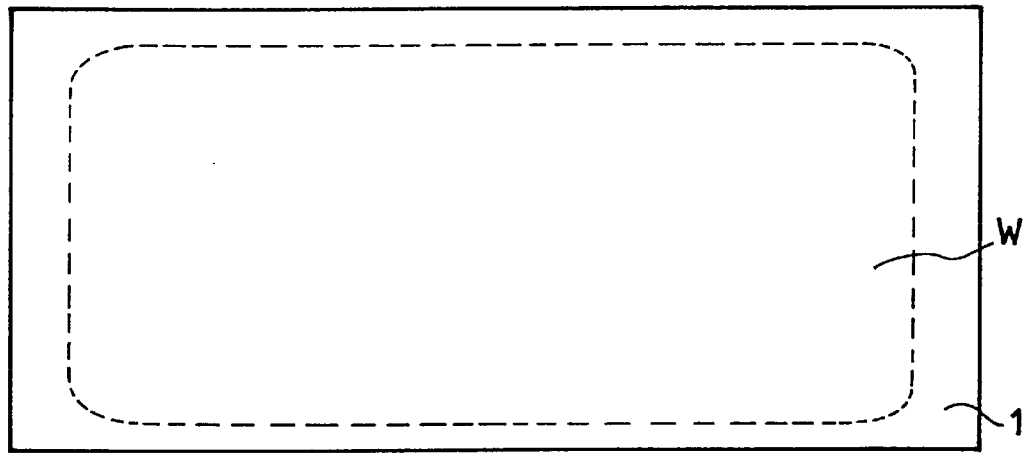
Figure 5:
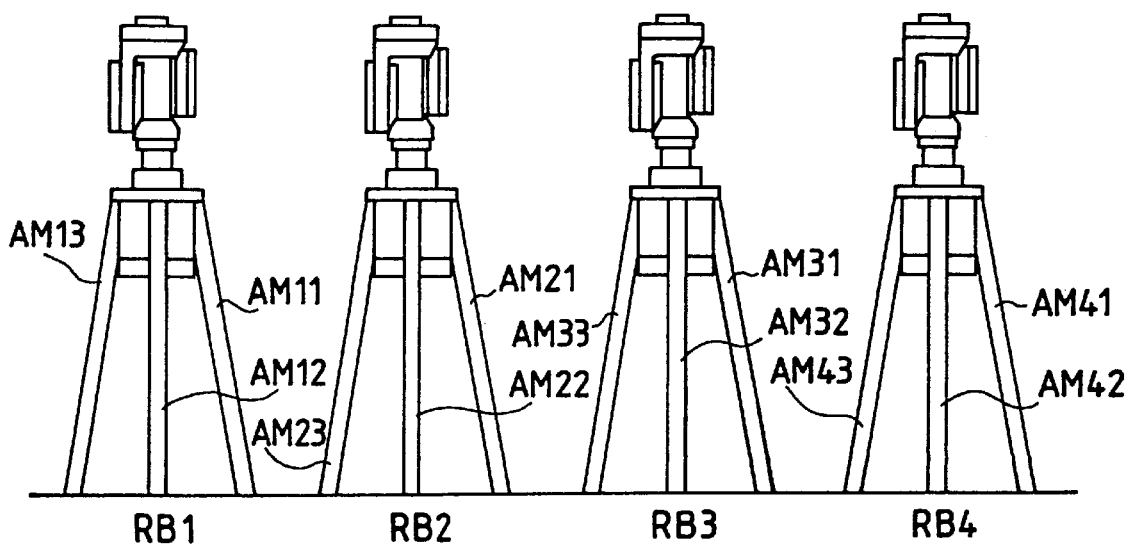

Referring to FIG. 5, suitability for a high-density layout of the parallel link robots employed in the spot welding system of the present invention will be described in comparison with articulated robots employed in a conventional spot welding system. In FIG. 5, reference numeral 1 denotes an area for a single operating stage, to which a workpiece W such as an automobile body is transferred.

Each of articulated robots RB11 and RB12 employed in the conventional spot welding system has a structure in which several links are combined in series with one another, and motors for driving the respective links are provided at respective joint mechanism portions. Therefore, each of the articulated robots RB11 and RB12 usually has projections for mounting the motors at the joint mechanism portions on basic axis, as indicated by symbols A and B.

As a result, it is difficult to arrange the robots at a high density, not taking motions of robot arms into consideration. Further, in consideration of a possible interference between robot arms which perform complicated turning in the operation of the robots, it is clear that arranging the robots at a high density becomes more difficult.

In contrast, the motors for basic axes of the parallel link robots RB1–RB4 employed in the present invention are mounted at the proximal end portions of the arms AM11–AM43. Therefore, the projections A and B for mounting motors in the articulated robots RB11 and RB12 can be omitted in the parallel link robots RB1 to RB4. Thus, the parallel link robots RB1–RB4 employed in the present invention are suitable for the high-density layout. Further, the arms AM11–AM43 of the respective basic axes are expandable and retractable, and thus scarcely make a turning action. Therefore, it is evident that the parallel link robots RB1–RB4 are suitable for the high-density layout in view of the possible interference.

Figure 4:
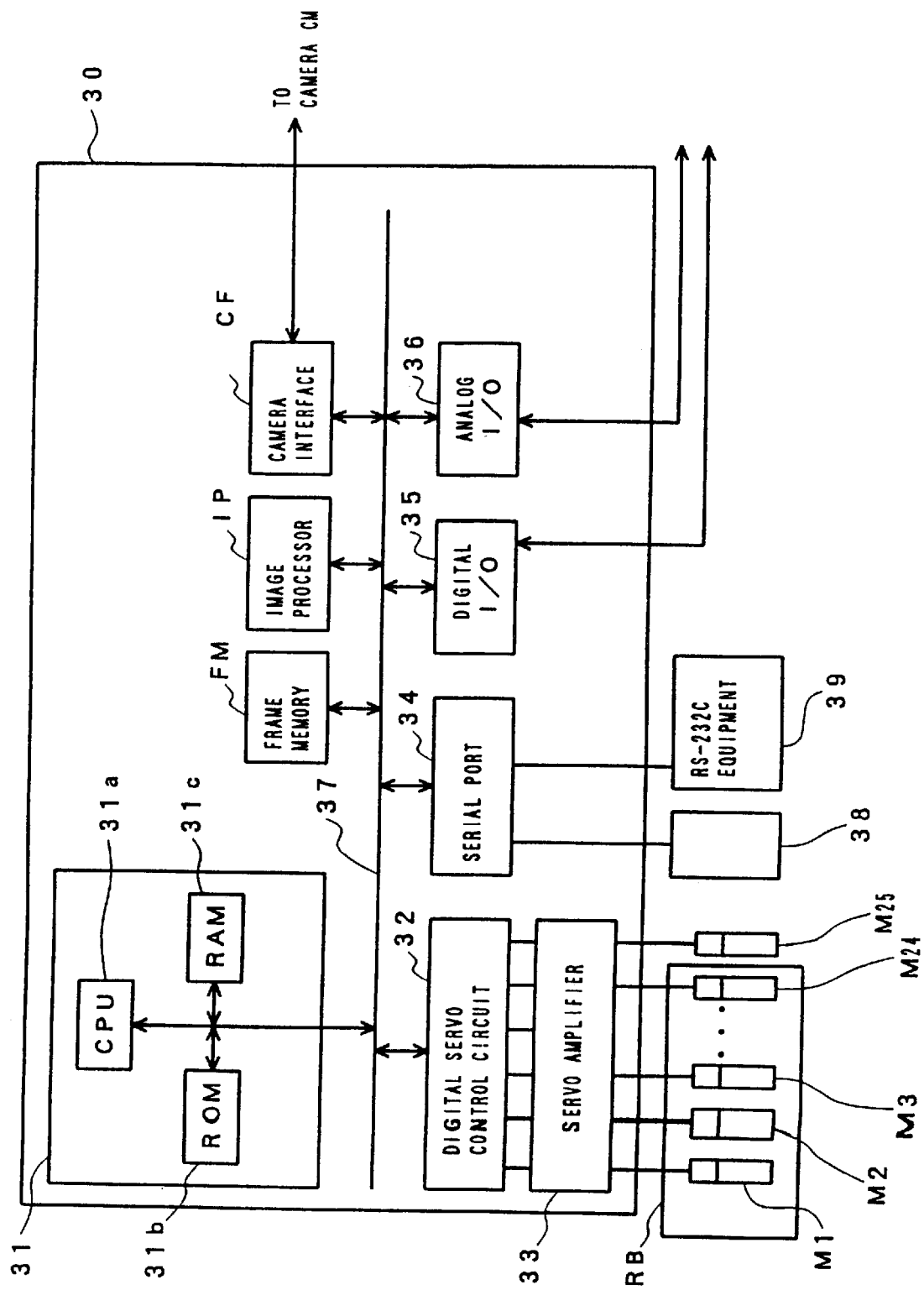
FIG. 4 is a block diagram showing a principal part of a controller which can be used in the embodiments of the invention.

A principal part of the controller 30 of FIG. 2 is shown in FIG. 4. In FIG. 4, the controller 30 is equipped with a processor board 31 which has a central processing unit (CPU) 31a in the form of a microprocessor, ROM 31b and RAM 31c.

The CPU 31a controls the whole of the controller and various parts according to programs stored in the ROM 31b.

The programs stored in the ROM 31b include various programs necessary for the tracking to carry out spot welding without stopping the workpiece W at the operating stage.

Prepared operation programs, various set values, etc. are downloaded to the RAM 31c. Further, a part of the RAM 31c is used for temporarily storage of data for calculation processing to be executed by the CPU 31a. A hard disk device or the like prepared as an external device is appropriately utilized for downloading and storing the program data and set values to the RAM 31c.

The processor board 31 is connected to a bus 37 and commands and data are transmitted with other parts of the controller 30 via the bus 37. A digital servo control circuit 32 connected with the processor board 31 controls the servomotors M1–M25 of the robots RB1–RB4 (collective labelled RB) through a servo amplifier 33 on receipt of a command from the CPU 31a.

Among these servomotors M1–M25, the servomotors M1–M6 are for respectively driving to expand and retract the arms AM11–AM13 of the parallel link robot RB1 and for rotationally driving the wrist axes of the robot RB1. Similarly, the servomotors M7–M12, M13–M18 and M19–M24 are for driving to expand and retract the arms of the parallel link robots RB2–RB4, and for rotationally driving the wrist axes of the robots RB2–RB4, respectively. The servomotor M25 is for driving the traveling axis. The number of motors is increased in the case where the guns G1–G4 are servoguns.

A serial port 34 is connected to the bus 37 and to a teaching operation panel 38 with a liquid crystal display and also to an RS-232C equipment (communication interface) 39. The teaching operation panel 38 is used for manually inputting various types of commands and for inputting and editing various types of programs, position data, set values, etc. necessary for operating the system.

A digital signal input/output device (digital I/O) 35 and an analog signal input/output device (analog I/O) 36 are connected to the bus 37 for transmitting signals with external devices. Further, a camera interface CF, an image processor IP, and a frame memory FM are connected to the bus 37 to provide the controller with a function of the visual sensor including the camera CM.

An operation of the spot welding system with the above-described arrangement according to the first embodiment is outlined as follows, for example.

(1) When the tracking program starts in the controller 30, photographing of the workpiece W by the camera CM, image processing by the frame memory FM and the image processor IP are started.

(2) When the arrival of the workpiece W is detected by the function of the visual sensor, the operation programs for the parallel link robots RB1–RB4 and the guns G1–G4 are executed with a predetermined timing. In addition, the tracking of the workpiece is started by the drive of the servomotor M25 (the traveling axis).

(3) The parallel link robots R1–R4 cooperate to carry out the spot welding using the guns G1–G4 on a plurality of welding points, while continuing the tracking motion.

(4) Upon completion of the spot welding, the parallel link robots RB1–RB4 are shunted from the workpiece W to terminate the tracking motion.

(5) After returning the positions of the respective axes of the parallel link robots RB1–BR4 and the traveling axis to their respective home positions, the system resumes the stage (1) to await the arrival of the next workpiece. Thus, the operations (1)–(5) are repeated.

The program for controlling the operations at the respective stages are defined in accordance with a specific task to be performed and therefore is not particularly limited according to the present invention. The tracking operation using the traveling axis is merely an application of a well-known linear tracking technique, and thus the detailed description thereof is omitted here.

Figure 3:
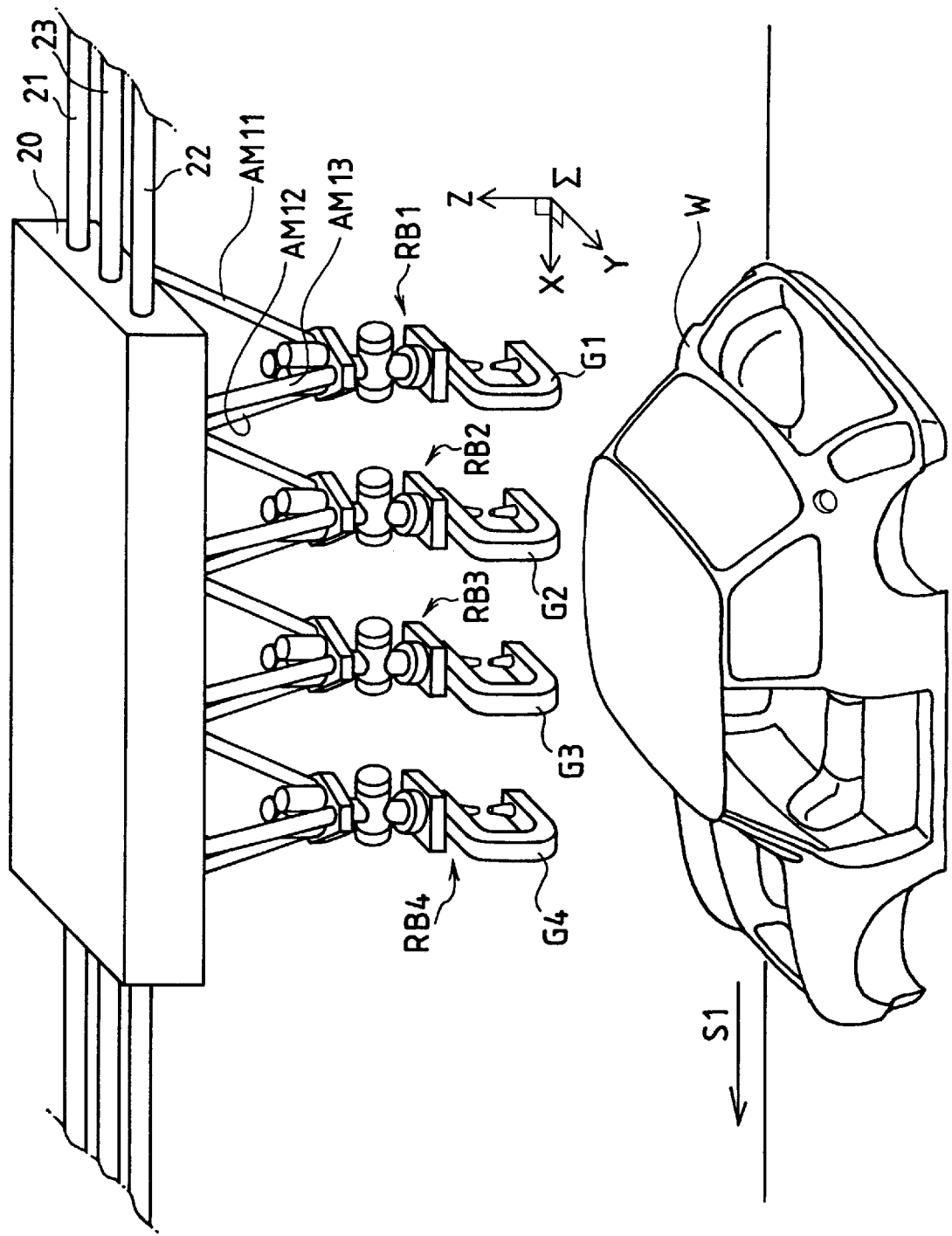
FIG. 3 is a perspective view showing a schematic layout of a spot welding system according to a second embodiment of the invention.

Next, referring to FIG. 3, a second embodiment will be described. In the second embodiment, parallel link robots are densely arranged in a suspended way. That is, the parallel link robots RB1–RB4 are of the same type as in the first embodiment, and each robot is a 6-axis robot including a parallel link having three expandable and retractable arms AM11–AM13, and a wrist having three rotary drive axes.

The parallel link robots RB1–RB4 are suspended from a frame 20 so that the expandable and retractable arms AM11–AM13 thereof hang over a supply location of a workpiece W, and the welding guns G1–G4 are attached to the distal ends of the wrists of the robots. Some of the parallel link robots RB1–RB4 may, in some cases, function as robots (e.g., jig robots) other than the welding robots.

The frame 20 has a structure similar to that of the frame 10 in the first embodiment except for its boxlike shape. The arms AM11–AM13 extend into the frame 20 through holes (not shown) at predetermined positions. Like the first embodiment, bearing mechanisms are provided inside the holes, for swingably supporting the arms AM11–AM13.

Since the inner structure of the frame 20 is similar to that of the base portion 12 of the first embodiment, a detailed description thereof is omitted. In this embodiment, however, traveling of the frame 20 is allowed by guides 21, 22 and a rack 23, whose ends are mounted on an appropriate structure at a height. The servomotor M25 (see FIG. 2) serving as a drive source for the traveling axis, a reduction gear, a pinion engaged with the rack 23, etc. are arranged inside the frame 20 in a similar way to that in the first embodiment.

A controller for generally controlling the parallel link robots RB1–RB4, the traveling axis (servomotor M25), the camera CM (omitted in FIG. 2) and the spot welding guns G1–G4 is also arranged inside the frame 20 in a similar way to that in the first embodiment.

The controller is of the same type as that in the first embodiment. The constitution and function of the controller are the same as those described with reference to FIG. 4. A general operation of the spot welding system of the second embodiment is similar to that of the spot welding system of the first embodiment except that the operation program is different because of the difference of the posture of the parallel link robots RB1–RB4.

In the foregoing two embodiments, the pinion/rack mechanism is employed for traveling of the frame, but other traveling mechanisms, e.g., a traveling mechanism using a linear motor may be employed.

According to the spot welding system of the present invention, a plurality of robots can be arranged densely and therefore it is advantageous in improving the efficiency of spot welding operation and saving space.

What is claimed is:

1. A spot welding system comprising:
   a frame;
   a plurality of robots, each robot having a plurality of arms and a wrist, the wrist having a plurality of drive axes, each of the plurality of arms being expandable and retractable and having distal and proximal ends, the proximal ends of the plurality of arms being supported by the frame, the distal ends of the plurality of arms of each robot being connected to the wrist of the robot such that for each robot, the plurality of arms commonly support the wrist; and
   a welding gun attached to the wrist of each robot.

2. A spot welding system according to claim 1, wherein the plurality of arms project through the frame respectively at frame/arm interfaces, the spot welding system further comprising bearings attached to the frame at the frame/arm interfaces.

3. A spot welding system according to claim 1, wherein the tool of each robot is positioned in the vicinity of a workpiece travelling in a conveying direction, the frame being supported for movement in the conveying direction.

4. A spot welding system according to claim 1, wherein:
   the tool of each robot is positioned in the vicinity of a workpiece travelling in a conveying direction, the workpiece being conveyed by a conveyer located along a floor under the workpiece; and
   the frame is positioned next to the workpiece such that the plurality of robots project laterally into a plane generally perpendicular with the floor.

5. A spot welding system according to claim 1, wherein:
   the tool of each robot is positioned in the vicinity of a workpiece travelling in a conveying direction, the workpiece being conveyed by a conveyer located along a floor under the workpiece, and
   the frame is positioned above the workpiece such that the plurality of robots are suspended from the frame to project into a plane parallel with the floor.

6. A spot welding system according to claim 3, further comprising a camera for detecting the workpiece being conveyed, such that when the workpiece is detected by said camera, said robots carry out spot welding on said workpiece while said frame moves in the conveying direction to track the position of the workpiece.

* * * * *